United States Patent [19]

Barker et al.

[11] Patent Number: 5,137,848

[45] Date of Patent: Aug. 11, 1992

[54] DIELECTRIC COMPOSITION CONTAINING KERF ADDITIVE

[75] Inventors: Michael F. Barker, Bristol; William A. Craig, Luckington, both of England; Paul C. Donohue, Wilmington, Del.; Kenneth W. Hang, West Chester, Pa.; Michael J. Haun, Golden, Colo.; Colin R. Pickering, Bristol, England

[73] Assignee: E. I. Du Pont de Nemours and Company, Wilmington, Del.

[21] Appl. No.: 626,889

[22] Filed: Dec. 13, 1990

[51] Int. Cl.$^5$ .................. C03C 17/28; C03C 8/16; C03C 8/20

[52] U.S. Cl. ........................... 501/18; 501/26; 501/32

[58] Field of Search .................. 501/26, 18, 32, 20

[56] References Cited

U.S. PATENT DOCUMENTS

| | | | |
|---|---|---|---|
| 3,649,353 | 3/1972 | Ulrich | 501/18 X |
| 3,707,499 | 12/1972 | Mason et al. | 501/18 X |
| 3,787,219 | 1/1974 | Amin | 501/32 |
| 4,323,652 | 4/1982 | Baudry et al. | 501/32 X |
| 4,392,180 | 7/1983 | Naitz | 501/21 X |
| 4,481,261 | 11/1984 | Johnson et al. | 501/20 X |
| 4,654,095 | 3/1987 | Steinberg | 501/20 X |
| 4,959,330 | 9/1990 | Donohue et al. | 501/26 X |

Primary Examiner—William R. Dixon, Jr.
Assistant Examiner—Lisa M. Schull

[57] ABSTRACT

A dielectric composition comprising an admixture of finely divided particles of (a) 65-94 wt % of a non-reducing amorphous glass comprising of 15-27% ZnO, 8-30% alkaline earth metal oxides including 7-21% BaO, 40-60% $SiO_2$, 3-14% $Al_2O_3$, 0-5% PbO and 0.5-5% of a metal oxide selected from $ZrO_2$, up to 2.5% $P_2O_5$ and mixtures thereof, the composition being crystallizable and non-reducing when fired at 850°-900° C.

(b) 30-5 wt % of a metal oxide of $Al_2O_3$, $ZrSiO_4$ and mixtures thereof, (c) 1-5 wt % of a metal oxide kerf additive of $CoAl_2O_4$, $Co/CrAl_2O_4$, CoO, $CoCr_2O_4$, $Cr_2O_3$, $TiO_2$, and mixtures thereof, where the sum of the components a and b does not exceed 35% by weight of the total particulate admixture, and (d) optionally, 1-10 wt % of either a TCE reducing additive of zircon, mullite, silica, and mixtures thereof or a TCE increasing additive of $CaZrO_3$, quartz, α-cristobalite and mixtures thereof.

6 Claims, No Drawings

DIELECTRIC COMPOSITION CONTAINING KERF ADDITIVE

FIELD OF THE INVENTION

The invention relates to filled crystallizable glass dielectric compositions which are especially useful for making multilayer interconnects.

BACKGROUND OF THE INVENTION

Multilayer interconnect (MLI) circuits are increasingly important in hybrid microcircuit electronics for the connection of silicon integrated circuits to the outside world. The MLI is composed of insulating dielectric layers separating metal conducting signal lines which are connected by vias through the layers. The silicon integrated circuit is generally mounted in a chip carrier on the top of the MLI circuit.

As the silicon circuits become larger and have higher speed, more demands are placed on the properties of the MLI. The layers should have a low dielectric constant and dissipation factor, high insulation resistance and breakdown voltage. They must be physically strong, moisture-resistant, pinhole- and blister-free and compatible with the electrode metallizations. The metallizations may be air-fired noble metals, silver or silver alloys, gold or they may be copper which requires nitrogen firing throughout manufacture. The metallization should be easily solderable and adhere well to the dielectric after thermal aging.

The property requirements are achieved both by design of the glass composition and the addition of certain fillers. The powdered ingredients are mixed with organic vehicle to form a paste or tape for laying down the layers. The layers and metallizations are fired either together or sequentially at a temperature sufficient to densify the glass and ceramic components.

SUMMARY OF THE INVENTION

In a first aspect, the invention is directed to a dielectric composition comprising an admixture of finely divided particles of (a) 65-94% by weight of a glass consisting essentially of 15-27% ZnO, 8-30% alkaline earth metal oxides selected from 7-21% BaO, 0-20% CaO, 0-12% SrO and mixtures thereof, 40-60% $SiO_2$, 3-14% $Al_2O_3$, 0-5% PbO and 0.5-5% of a metal oxide selected from $ZrO_2$, up to 2.5% $P_2O_5$ and mixtures thereof, the composition being crystallizable and non-reducing when fired at 850°-900° C. (b) 30-5% by weight, of a metal oxide selected from the group consisting of $Al_2O_3$, $ZrSiO_4$ and mixtures thereof and (c) 1-5% by weight of a metal oxide kerf additive selected from the group consisting of $CoAl_2O_4$, $Co/CrAl_2O_4$, CoO, $CoCr_2O_4$, $Cr_2O_3$, $TiO_2$ and mixtures thereof, the sum of non-glass solids not exceeding 35% by weight of the total particulate admixture.

In a second aspect, the invention is directed to thick film compositions comprising the above-described dielectric composition dispersed in an organic medium.

In a third aspect, the invention is directed to dielectric green tapes comprising the above-described dielectric composition dispersed in a matrix of volatilizable solid organic polymer.

Definitions

Thick Film Processing Conditions—As used herein, the captioned term refers to a firing cycle of approximately 30 to 60 min., of which 5-10 min. is at a peak temperature of 850°-900° C.

Remainder Glass—When the glass composition of the invention is heated under Thick Film Processing Conditions, at least one crystal phase is formed out of the parent glass. The thusly formed crystals are dispersed in a matrix of the parent glass which has been changed in composition by the formation of the crystals therefrom. This glass, which remains after crystal formation and which serves as a matrix for the formed ceramic crystals, is referred to herein as "remainder glass".

PRIOR ART

U.S. Pat. No. 3,787,219 Amin

The reference is directed to a printable dielectric composition consisting of 1-40% wt. $CaTiO_3$ $\neq and$ 99-60% wt. of lead-free crystallizable glass frit. Upon firing, one major crystalline phase is formed from the glass—celsian ($BaAl_2Si_2O_8$)—and two minor phases are formed—sphene ($CaTiSiO_5$) and zinc orthosilicate [$(ZnO)_2SiO_2$].

U.S. Pat. No. 3,649,353 Ulrich

The reference is directed to a dielectric thick film composition consisting of 10-90% wt. $BaTiO_3$ and a crystallizable lead-free $BaTiO_3$ glass frit. Upon firing at 700°-1300° C., two crystalline phases are formed. The frit composition by weight is 54.7% BaO, 24.0% $TiO_2$, 3.2% $BaF_2$, 7.9% $Al_2O_3$, 2.0% $GeO_2$ and 8.2% $SiO_2$.

U.S. Pat. No. 4,323,652, Baudry et al.

The patent is directed to dielectric glasses containing on a molar basis 30-50% $SiO_2$, 20-40% ZnO, 0-20% $B_2O_3$, 0-10% $Al_2O_3$, 5-40% CaO, SrO and BaO, and 0-10% CoO. The reference glass does not have to contain $Al_2O_3$.

U.S. Pat. No. 4,392,180 Nair

The Nair patent is directed to thick film dielectric compositions comprising substituted perovskite inorganic dopant and a low temperature devitrifiable frit. The frit is disclosed generally to include glasses which yield a single crystalline phase having the same composition as the parent glass or which yield multiple crystalline phases having different compositions than the parent glass.

EP Appln. 87110052.5 Nair

The patent application is directed to crystallizing glasses having the following compositions by weight:

| | | |
|---|---|---|
| $SiO_2$ | 30% | 30% |
| $TiO_2$ | 8 | 8 |
| $Al_2O_3$ | 10 | 10 |
| BaO | 26 | 10 |
| ZnO | 10 | 10 |
| CaO | 6 | 24 |
| $B_2O_3$ | 8 | 8 |
| MgO | 2 | — |

EP Appln. 87110060.8 Nair

The patent application is directed to a crystallizing glass having the following compositions by weight: 30% $SiO_2$, 8% $TiO_2$ or $ZrO_2$, 12% $Al_2O_3$, 12% BaO, 24% ZnO, 6% CaO and 8% $B_2O_3$.

Swiss 1180361 Nemkovich

The patent discloses an essentially non-crystallizing dielectric glass prepared on a weight basis from 2-6% $SiO_2$, 31-75% $B_2O_3$, 18-20% $Al_2O_3$, 30-32% BaO, 4-6% CaO, 3-5% MgO and 1-7% ZnO.

Swiss 1127856 Bobkova et al.

The patent discloses low dielectric glass prepared on a weight basis from 21-23.5% $SiO_2$, 20-25% $B_2O_3$, 18-22% BaO, 8-10% $Al_2O_3$, 20-25% ZnO and $TeO_2$.

DETAILED DESCRIPTION OF THE INVENTION

In General

The celsian crystallizable glasses of U.S. patent application Ser. No. 07/368,843 now abandoned are useful for the fabrication of multilayer interconnect circuitry. The glasses are designed to flow and crystallize to form dielectric layers with superior density and blister resistance combined with low dielectric constant and dissipation factor. However, two problems may arise due to the high film density which would limit their utility:

1. When the surface is scratched, the films are subject to conchoidal fracture propagation or brittle failure.
2. When thick film resistors, optionally on the top layer, are trimmed, the laser does not penetrate evenly and causes explosive chipout along the laser formed kerf. This results in higher than usual laser trim drift of the resistors.

We have found that these problems can, however, be corrected with the proper choice and level of fillers added as powders to the glass powder in the dielectric paste. The paste can then be screen printed and fired in the same way, but the resulting layers now have the required strength and laser trimability to allow commercial utility.

Although fillers are often added to glasses to form dielectrics, only certain fillers were found to be useful in this glass system to correct the above-mentioned.

To correct brittle failure, aluminum oxide powder was most effective. Many fillers were effective at high loading, but with accompanying porosity which compromised hermiticity as indicated by high leakage current. Alumina powder addition within limited quantities, was effective in preventing fracture while maintaining sufficient film density for low leakage current. Because the addition of alumina shifted the expansion of the film, additional fillers were found to be needed. Lower expansion fillers such as zircon or mullite were found to be useful to correct expansion, and when combined with alumina, provided the necessary fracture resistance.

To correct the problem of laser trim kerf-chipping, requires a somewhat different approach. The laser must be absorbed evenly to allow smooth vaporization of the dielectric. Fillers found most effective were $TiO_2$ and colorant. The colorant may be $CoAl_2O_4$, $(Co,Cr)Al_2O_4$ or almost any strongly light absorbing inorganic oxide such as black CoO. The combination with $TiO_2$, either rutile or anatase forms, is the most effective. Filler may be added up to the point where the glass flow is no longer sufficient to produce a hermetic film, about 35 wt. % of total solids.

Neither class of fillers is effective in solving both problems and must be used in combination for a completely acceptable dielectric. The alumina, while solving the brittle fracture, does not improve the laser trim kerf, while the $TiO_2$ and colorants do not improve the fracture. Careful control of the filler levels is needed to achieve the proper combination of properties.

Glass Frit

The glasses suitable for use in the invention are amorphous aluminosilicates which, upon being subjected to thick film processing conditions as defined above, form a primary crystalline ceramic phase of $BaAl_2Si_2O_8$ (celsian or hexacelsian). When these glasses are fired at higher temperatures such as 900° C., a secondary crystalline ceramic phase of hardystonite ($Ca_2ZnSi_2O_7$) may also be formed if calcium is present.

It has been found that glass compositions particularly suited to formation of dielectric layers are free of boron, alkali and reducible low melting oxides of lead, cadmium or bismuth. Boron oxide tends to entrap water and hydrocarbons which on firing are released forming bubbles. Alkali ions in the glass can diffuse and compromise the insulation of the layer resulting in low IR, BDV and shorts. Reducible, low melting oxides can produce blistering due to excessive glass flow and loss of oxygen on firing. However, these elements also tend to produce good glass flow which is required for dense film formation at the commonly used firing temperature of 850° C.

It was found that to get sufficient glass flow, the combination of Ba and Zn modifying elements in silicate glasses are most effective. The glasses of the invention contain in mole % 15-27% ZnO and 8-30% alkaline earth metal oxides consisting of 7-21% BaO, 0.5-20% CaO and 0-12% SrO. This combination of ZnO and alkaline earth metal oxides is also most effective in promoting vehicle burnout, especially in nitrogen firing in Cu/MLI fabrication.

Silica functions in the glass as a network former and can range from 40-60 mole %. Above 60%, the glasses are too high melting for sufficient flow at film forming temperatures. Below 40%, there is likely to be insufficient $SiO_2$ for complete glass formation and the glass excessively crystallizes, thus reducing hermeticity of the films. Poor hermeticity is indicated by high leakage current. At least 45% silica is preferred.

Alumina is also required to assist glass formation and to promote crystallization. These glasses in the system: $BaO/ZnO/SiO_2/Al_2O_3$ tend to crystallize on refiring during film manufacture between 850° and 900° C. Crystallization is desirable since it tends to limit glass flow on refire of the layers and decrease blister formation. The crystallizing phase is primarily celsian, $BaAl_2Si_2O_8$.

Because of its excellent glass-forming properties up to 5% of the CaO and SrO can be replaced by PbO or up to 5% PbO can be used in addition to the above described amounts of alkaline earth metal oxides.

Since the $Al_2O_3$ concentration in the glass is limited by solubility, it is also the limiting factor in celsian formation. At high $Al_2O_3$ content, about 12 mole %, the glasses flow less, crystallize more and are blister-free. This is most useful in Cu/MLI manufacture at 900° C. in $N_2$. At lower $Al_2O_3$ content, 5-6%, the glasses flow more, crystallize less, and are more suitable for 850° C. air fired layers. They are not as good in $N_2$ firing due to increased blister formation. Also, $Al_2O_3$ contents below 5% will produce excessive blisters.

It was found that the layers could be further improved by incorporation of $P_2O_5$ and/or $ZrO_2$ in the glass, $P_2O_5$ tends to improve glass flow and increase bonding to the metallization, especially Cu. The $ZrO_2$ also improves glass flow and improves the electrical properties of the layers. The presence of $ZrO_2$ is most useful in air fired layers to lower the DF, improve IR and decrease blistering. It is most effective in the absence of $P_2O_5$. Because of the limited solubility of $P_2O_5$ and $ZrO_2$ in this glass system, the useful range is up to about 5 mole % of each. It is preferred to use no more than 2.5 mole % $P_2O_5$.

The glasses are prepared by conventional glass-making techniques, i.e., by mixing the desired components in the desired proportions and heating the mixture to form a melt. As is well known in the art, heating is conducted to a peak temperature and for a time such that the melt becomes entirely liquid and homogeneous. In preparing the compositions of the invention, the components are premixed by shaking in a polyethylene jar with plastic balls and then melted in a platinum or ceramic container at about 1550° C. The melt is heated at the peak temperature for a period of at least one hour. Heating for less than one hour would result in inhomogeniety in the glass. A heating time of 1.5-2 hours is preferred. The melt is then poured into cold water. The maximum temperature of the water during quenching is kept below 120° F. by increasing the volumetric ratio of water to melt. The crude frit after separation from water is freed to residual water by drying in air or by displacing the water with methanol. The crude frit in slurry form is then ball milled in alumina containers using alumina balls. Alumina picked up by the materials, if any, is not within observable limits as measured by x-ray diffractional analysis.

After discharging the milled frit slurry from the mill, excess solvent is removed by decantation and the frit powder is air dried at 130° C. The dried powder is then screened through a 325 standard mesh screen to remove any large particles.

When the glasses of the invention are heated under thick film processing conditions, a primary phase of celsian or hexacelsian (as determined by x-ray diffraction) is formed out of the parent glass, crystals of which are dispersed in a matrix of the remainder glass, i.e., the glass which remains after crystallization. The remainder glass is always of different composition than the crystallized phase.

Organic Medium

Organic medium suitable for use in the invention are selected according to the physical form in which the encapsulant compositions are applied. In particular, the encapsulant glass frit can be applied as a thick film paste by screen printing and it can also be applied as a green tape.

When the encapsulant is applied by screen printing, the particles thereof are mixed with an inert liquid medium (vehicle) by mechanical mixing (e.g., on a roll mill) to form a pastelike composition having suitable consistency and rheology for screen printing. The latter is printed as a "thick film" in the conventional manner.

The main purpose of the organic medium is to serve as a vehicle for dispersion of the finely divided solids of the composition in such form that it can readily be applied to ceramic or other substrates. Thus the organic medium must first of all be one in which the solids are dispersible with an adequate degree of stability. Secondly, the rheological properties of the organic medium must be such that they lend good application properties to the dispersion.

Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling, and good firing properties. Satisfactory appearance of the fired composition is also important.

In view of all these criteria, a wide variety of liquids can be used as organic medium. The organic medium for most thick film compositions is typically a solution of resin in a solvent frequently also containing thixotropic agents and wetting agents. The solvents usually boil within the range of 130°-350° C.

Suitable solvents include kerosene, mineral spirits, dibutylphthalate, butyl Carbitol ™, butyl Carbitol ™ acetate, hexylene glycol and high boiling alcohols and alcohol esters. Various combinations of these and other solvents are formulated to obtain the desired viscosity and volatility.

By far the most frequently used and a frequently preferred resin for this purpose is ethyl cellulose. However, resins such as ethylhydroxyethyl cellulose, wood rosin, mixtures of ethyl cellulose and phenolic resins, polymethacrylates of lower alcohols and monobutyl ether of ethylene glycol monoacetate can also be used.

A preferred vehicle for thick film applications is based on ethyl cellulose and $\beta$-terpineol in a weight ratio of about 1:8. The pastes are conveniently prepared on a three-roll mill. A preferred viscosity for these compositions is approximately 100-200 Pa.s. measured on a Brookfield HBT viscometer using a #5 spindle at 10 rpm. The amount of vehicle utilized is determined by the final desired formulation viscosity.

Among the thixotropic agents which are commonly used are hydrogenated castor oil and derivatives thereof and ethyl cellulose. It is, of course, not always necessary to incorporate a thixotropic agent since the solvent resin properties coupled with the shear thinning inherent in any suspension may alone be suitable in this regard. Suitable wetting agents include phosphate esters and soya lecithin.

The ratio of organic medium to solids in the paste dispersions can vary considerably and depends upon the manner in which the dispersion is to be applied and the kind of organic medium used. Normally, to achieve good coverage, the dispersions will contain complementally by weight 40-90% solids and 60-10% organic medium.

The pastes are conveniently prepared on medium (vehicle) utilized is determined mainly by the final desired formulation viscosity and print thickness.

The compositions of the invention can also be easily used for the manufacture of green tape by the conventional method of slip casting a slurry of the glass particles dispersed in a solution of binder polymer, plasticizer and volatile solvent onto a flexible carrier such as polypropylene or Mylar ® polyester film or stainless steel, adjusting the thickness of the cast film by passing the cast slurry under a doctor blade and then heating the doctored slurry to remove the volatile solvent from the layer by evaporation. The solid layer of solids dispersed in a matrix of polymeric binder is removed from the carrier and slit to appropriate widths for use in making multilayer structures. Green tapes of this kind generally have a thickness of 3 to 15 mils.

A wide variety of polymeric materials can be used as the binder for green tape such as poly (vinyl butyral), poly (vinyl acetate), poly (vinyl alcohol), cellulosic polymers such as methyl cellulose, ethyl cellulose, hydroxyethyl cellulose, methylhydroxyethyl cellulose, atactic polypropylene, polyethylene, silicon polymers such as poly (methyl siloxane), poly (methylphenyl siloxane), polystyrene, butadiene/styrene copolymer, polystyrene, poly (vinyl pyrrolidone), polyamides, high molecular weight polyethers, copolymers of ethylene oxide and propylene oxide, polyacrylamides, and various acrylic polymers such as sodium polyacrylate, poly (lower alkyl acrylates), poly (lower alkyl methacrylates) and various copolymers and multipolymers of lower alkyl acrylates and methacrylates. Copolymers of ethyl methacrylate and methyl acrylate and terpolymers of ethyl acrylate, methyl methacrylate and methacrylic acid.

A preferred class of polymeric binders for making green tapes for the composition of the invention are those disclosed by Usala in U.S. Pat. No. 4,613,648. These polymeric binders are a mixture of compatible multipolymers of 0–100% wt. $C_{1-8}$ alkyl methacrylate, 100–0% wt. $C_{1-8}$ alkyl acrylate, and 0–5% wt. ethylenically unsaturated carboxylic acid or amine, the multipolymer being further characterized as having a number average molecular weight ($M_n$) of 50,000 to 100,000, a weight average molecular weight ($M_w$) of 150,000 to 350,000, the ratio of $M_w$ to $M_n$ being no greater than 5.5, the total amount of unsaturated carboxylic acid or amine in the multipolymer mixture is 0.2–2.0% wt., and the glass transition temperature of the polymer and plasticizer therein, if any, is $-30°$ to $+45°$ C.

The organic medium in which the ceramic solids are dispersed contains principally the polymeric binder dissolved in organic solvent. However, the medium may contain other dissolved materials such as plasticizers, release agents, dispersing agents, thixotropic agents, stripping agents, antifouling agents and wetting agents.

It will be recognized that by adjusting the rheological properties of the dispersions of the invention and by changing the solvent component of the organic medium, the invention compositions can be applied to substrates by other methods than casting, e.g., by screen printing. When the compositions are applied by screen printing, the conventional organic media materials used for thick film materials can be used so long as the acrylic polymers are completely soluble therein at application temperatures.

For casting solutions, the solvent component of the organic medium is chosen so as to obtain complete solution therein of the polymer and sufficiently high volatility to enable the solvent to be evaporated from the dispersion by the application of relatively low levels of heat at atmospheric pressure. In addition, the solvent must boil well below the boiling point and decomposition temperature of any other additives contained in the organic medium. Thus, solvents having atmospheric boiling points below 150° C. are used most frequently. Such solvents include benzene, acetone, xylene, methanol, ethanol, methylethyl ketone, 1,1,1-trichloroethane, tetrachloroethylene, amyl acetate, 2,2,4-triethylpentanediol-1,3-mono isobutyrate, toluene, methylene chloride, 2-propanol and Freon ® TF (trichlorotrifluoroethane).

Test Procedures

Capacitance

Capacitance is a measure of the capability of a material to store an electric charge. Expressed mathematically, C=KA divided by t, where A equals area overlap of the conductors, t is thickness of the dielectric layer and K is dielectric constant.

The units of capacitance are farads or fractions thereof such as microfarads, $10^{-9}$ farad, or picofarads $10^{-12}$ farad.

Dissipation Factor

Dissipation Factor (DF) is a measure of the phase difference between voltage and current. In a perfect capacitor, the phase difference would be 90°. However, in practical dielectric systems, DF is less than 90° because of leakage and relaxation losses. In particular, DF is the tangent of the angle by which the current lags the 90° vector.

Insulation Resistance

Insulation resistance (IR) is a measure of the ability of a charge capacitor to withstand leakage in DC current. Insulation resistance is a constant for any given dielectric regardless of capacitance.

The IR test under hot conditions is performed at room temperature. The test itself measures "RC Product" which is the product of IR times Capacitance. The IR is then calculated from the RC product by dividing into it the previously measured value of Capacitance. Under these conditions, the IR is determined periodically during the aging process. An IR value of $1 \times 10^9$ ohms is considered to be satisfactory and IR values of at least $1 \times 10^{12}$ ohms are preferred.

Breakdown Voltage

The Breakdown Voltage test (also called the dielectric strength test) consists of the application of a voltage higher than rated voltage for a specific time between mutually insulated portions of a component part or between insulated portions and ground. The voltage is raised until the system fails which is indicated by short circuiting. This is used to observe whether the component part can operate safely at its rated voltage and withstand momentary overpotentials due to switching, surges, and other similar phenomena. Although this test is often called a voltage breakdown or dielectric strength test, it is not intended that this test cause insulation breakdown or that it be used for detecting corona. Rather it serves to determine whether insulating materials and spacings in the component part are adequate. When a component part is faulty in these respects, application of the test voltage will result in either disruptive discharge or deterioration. Disruptive discharge is eveidenced by flashover (surface discharge), sparkover (air discharge), or breakdown (puncture discharge). Deterioration due to excessive leakage currents may change electrical parameters or physical characteristics. Dielectric breakdown is reported in volts/mil or volts/cm of dielectric thickness. Dielectric layers are designed to have sufficient thickness to provide a margin of safety well below the breakdown of the electric. The test is conducted in accordance with MIL-STD-202E. Apr. 16, 1973.

Leakage Current

The Leakage Current test is a measure of the level of hermeticity of a fired dielectric film as measured by a D.C. voltage-driven electrolytic current when the dielectric is immersed in a saline solution. The leakage current should be <1 $\mu A/CM^2$ for a very high quality dielectric. Many dielectrics can still be useful with higher leakage current values up to about 100. Lower values are preferred, however.

Test specimens are prepared by printing a thick film conducting pattern on twelve 2"×2" $Al_2O_3$ substrates. The conductor patterns are oven dried at 110°–120° C. and then fired at 850° C. Two layers of patterned dielectric materials are then applied sequentially on top of the fired conductor. Each of the layers is oven dried at 150° C. and fired at 850° C. Thickness of the combined dielectric layers is 30–50 μm.

These test prints are placed in a prewired connector and positioned in a 1.0N NaCl solution so that the test print is completely immersed. Using a platinum anode, 10 volts are applied between the conductor assembly and anode and the current for each of 10 test samples is measured after 5 mins. under voltage. A leakage current of 50 $\mu A/cm^2$ or less is considered satisfactory.

Fracture Test

This is a qualitative test in which the surface of a fired dielectric film is scratched with a diamond-tipped scribe and the scratch mark is observed and evaluated visually. In a satisfactory dielectric, there is a clean narrow scratch which would not propagate beyond the penetration of the diamond. In an unsatisfactory film, the surface fractures, spalls and chips out large areas beyond the penetration of the diamond.

Laser Trim Test

The surface of the dielectrics were laser scribed under conditions similar to those required to trim resistors on the commercial dielectrics. The kerf was examined visually for continuity, chips out and width. In the Examples of table 2, the width in arbitrary units is used. The width of the unfilled dielectric is 2.1 while the width of the control is 1.0 . Satisfactory kerf widths would be <1.5.

Commercial Control Glass

In many of our tests, we used a control standard commercial dielectric composed of a filled non-crystallizing glass. The glass is composed of oxides of calcium, lead, aluminum, boron and silicon. The filler is calcium zirconate.

In general, filled dielectrics are inferior to crystallizable dielectrics due to porosity which leads to shorting in humidity and loss of insulation resistance and breakdown. Also, due to greater degree of ion migration through the non crystallized glass, blisters tend to form under the top electrode on refires. On the positive side, the filled dielectrics have good mechanical strength and laser trimability.

Bowing Test

To measure the expansion match to the substrate in conditions approximating those in actual use, the following procedure was used.

The thickness of 2×2 in. alumina substrates are measured using a digital micrometer. The dielectric pastes are printed in a pattern having a hole in the center for measuring the change or bow as the layers are built up and fired. 3 layers are printed and dried then fired in the belt furnace at 850° C. 5–10 min. peak. This is repeated until 9 layers are built up. Then the bowing or deviation from the original, either positive or negative is measured. The substrates are refired to simulate firing during circuit build of conductors, vias resistors etc. and the bowing is measured up to 20 refires.

The control, would bow 9 mils in this test. Good values for the new dielectrics would be <6 mils (as requested by marketing). Also, the bowing should be positive to keep the top dielectric layer in compression to avoid via cracking.

Formulation

The glass ceramic compositions of the invention will ordinarily be formulated into a paste which is capable of being printed in any desired circuit pattern. Such pastes are made by dispersing the anhydrous glass frit into an appropriate organic medium as described hereinabove.

EXAMPLES

Examples 1 and 2

Two glasses were prepared by melting the ingredients at 1550° C. in Pt crucibles. The ingredients were weighed in proportions to produce the desired glass formula. The melts were fritted by pouring into water and powdered by ball milling in water for 8–36 hours. The slurries were dried at 130° C. in air. The compositions and TCE of the glasses are shown in Table 1 below:

TABLE 1

| | Glass Compositions | |
|---|---|---|
| Example No | 1 | 2 |
| Components | (mole %) | |
| BaO | 12.6 | 11.8 |
| SrO | 10.8 | 10.1 |
| CaO | 6.7 | — |
| ZnO | 16.0 | 21.3 |
| $Al_2O_3$ | 5.5 | 6.9 |
| $SiO_2$ | 46.0 | 47.5 |
| $ZrO_2$ | 2.4 | 2.4 |
| TCE ppm/C (calculated) | 8.3 | 6.8 |

Examples 3–9

A series of seven thick film compositions was prepared from 60/40 by weight mixtures of the glasses of Examples 1 and 2 by mixing them with Co, $CrAl_2O_4$, $TiO_2$ in various ratios and $Al_2O_3$ and $ZrSiO_4$. The pastes were prepared by roll milling the solids components with a cellulosic medium to a level of 75% wt. glass and 0.4% wt. colorant Co, $CrAl_2O_4$. The fillers were then added and roll milled and additional organic medium added to adjust the paste to screen-printable rheology. Films of the pastes were prepared over silver electrodes and the properties of the fired layers measured. These data are given in Table 2 below:

TABLE 2

| | Properties of Filled Thick Film Dielectric Layers | | | | | | |
|---|---|---|---|---|---|---|---|
| Example No. | 3 | 4 | 5 | 6 | 7 | 8 | 9 |
| Composition | | | | | | | |
| Glass | | | | | | | |
| Co,$CrAl_2O_4$ | — | 1.25 | 3.5 | 1.25 | 2.5 | 2.5 | 2.5 |
| $TiO_2$ | — | 3.75 | 1.5 | 3.75 | 2.5 | 2.5 | 2.5 |
| $Al_2O_3$ | — | — | — | 15.0 | 7.5 | 8.0 | 8.0 |
| $ZrSiO_4$ | — | — | — | — | 7.5 | 10.0 | 8.0 |

TABLE 2-continued

| | Properties of Filled Thick Film Dielectric Layers | | | | | | |
|---|---|---|---|---|---|---|---|
| Example No. | 3 | 4 | 5 | 6 | 7 | 8 | 9 |
| Properties of Fired Films | | | | | | | |
| K | 8.75 | 10.4 | 9.2 | 9.2 | 9.4 | — | — |
| DF, % | 0.025 | 0.018 | 0.051 | 0.011 | 0.030 | — | — |
| Leakage Current, $\mu A/cm^2$ | 0.019 | 0.14 | 0.016 | 5.2 | 0.59 | — | — |
| Laser Trim Kerf Width[1] | 2.1 | 1.2 | 1.2 | 1.2 | 1.1 | — | — |
| Expansion Match-Bowing | | | | | | | |
| (units), Initial | −0.6 | −4.8 | −2.5 | −7.0 | −0.6 | −0.8 | −0.3 |
| 10 Refires | 1.0 | −0.2 | −1.5 | −4.2 | 2.4 | 2.5 | 2.7 |
| 20 Refires | 2.6 | 4.6 | 4.0 | −0.1 | 3.8 | 4.0 | 4.3 |
| Brittle Fracture[2] | Worse | Worse | Worse | Equal | Equal | Equal | Equal |

[1] Kerf width of Commercial Control Glass equals 1.
[2] By comparison with Commercial Control Glass.

The examples show the improvement in the kerf with addition of filler, the improvement in brittle fracture with addition of alumina, and the adjustment of bowing to the desirable more positive values less than 5 mils by the addition of zircon. The level of filler, particular alumina and zircon, is limited by the introduction of porosity as seen in the rise in the leakage current above a total of about 15%.

Examples 10–30

A series of 22 thick film dielectric compositions containing different fillers was prepared, from the glasses of Examples 1 and 2, films were prepared therefrom and fired and the laser trimming properties of the fired films were tested and compared with the fired properties of a standard dielectric glass. In particular, the unfilled pastes were prepared by roll milling frit powder and 0.4% colorant Co(Cr)AlO₄ with a cellulosic vehicle. The filler was added as a paste made up in the same way. Blending was achieved by roll milling.

The dielectrics were laser scribed under conditions similar to those appropriate to the trimming of resistors over the standard products such as the Commercial Control Glass. The nature of the kerf was observed and a note was made of its continuity. The hermeticity of the dielectric was tested by the application and removal by water washing of "Magnaflux" penetrant SKL-W. Previous work has shown that any visible residue after this test signifies significant loss of hermeticity over hermetic samples. Mechanical strength was tested by manually drawing a diamond scribe across the surface of the dielectric. This results in removal of a fine line of material from the standard dielectric. Cracking and spalling of the dielectric was observed along the line of the scribe in the case of the unfilled new dielectrics.

These data are given in Table 3 below:

TABLE 3

| | | Properties of Filled Thick Film Dielectrics Layers | | | | | |
|---|---|---|---|---|---|---|---|
| | | Filler | | Kerf Properties | | Fired Film Properties | |
| Example No. | Glass Composition | Composition | Amount (% vol) | Fracture | Continuity | Hermeticity | Mech. Strength |
| Control | Control | — | — | VM | C | NR | — |
| 10 | Ex. 1 | — | — | BF | NC | NR | UC |
| 11 | Ex. 2 | — | — | BF | NC | NR | UC |
| 12 | 70130 Ex 1/Ex 2 | — | — | BF | C | NR | Control |
| 13 | 60140 Ex 1/Ex 2 | CoO | 1 (% wt) | BFN | C | NR | UC |
| 14 | 60140 Ex 1/Ex 2 | Co(Cr)Al | 1.25 (% wt) | BFN | C | NR | UC |
| 15 | 60140 Ex 1/Ex 2 | $TiO_2$ | 5 | BF | C | NR | UC |
| 16 | 60140 Ex 1/Ex 2 | $CaZrO_3$ | 5 | BF | NC | NR | UC |
| 17 | 60140 Ex 1/Ex 2 | Kaolin | 5 | BF | NC | SR | UC |
| 18 | 60140 Ex 1/Ex 2 | $Al_2O_3$[1] | 5 | BF | NC | SR | SCF |
| 19 | 60140 Ex 1/Ex 2 | $ZrSiO_4$ | 5 | BF | NC | NR | UC |
| 20 | 60140 Ex 1/Ex 2 | $Al_2O_3$[2] | 5 | BF | NC | NR | UC |
| 21 | 60140 Ex 1/Ex 2 | $SiO_2$ | 5 | BF | NC | NR | UC |
| 22 | 60140 Ex 1/Ex 2 | $ZrO_2$ | 5 | BF | NC | NR | UC |
| 23 | 60140 Ex 1/Ex 2 | $TiO_2$ | 15 | G | C | SR | SCF |
| 24 | 60140 Ex 1/Ex 2 | $CaZrO_3$ | 15 | BFN | NC | R | S |
| 25 | 60140 Ex 1/Ex 2 | $ZrSiO_4$ | 15 | BF | NC | SR | UC |
| 26 | 60140 Ex 1/Ex 2 | $Al_2O_3$[1] | 15 | BFN | C | R | SCF |
| 27 | 60140 Ex 1/Ex 2 | $Al_2O_3$[2] | 15 | BF | NC | SR | S |
| 28 | 60140 Ex 1/Ex 2 | Kaolin | 15 | BFN | NC | R | SCF |
| 29 | 60140 Ex 1/Ex 2 | $SiO_2$ | 15 | BF | NC | SR | SCF |

TABLE 3-continued

| | | Properties of Filled Thick Film Dielectrics Layers | | | | | |
|---|---|---|---|---|---|---|---|
| | | Filler | | Kerf Properties | | Fired Film Properties | |
| Example No. | Glass Composition | Composition | Amount (% vol) | Fracture | Continuity | Hermeticity | Mech. Strength |
| 30 | 60140 Ex 1/Ex 2 | ZrO$_2$ | 15 | BFN | NC | NR | SCF |

[1] fine particles, surface area 7-10 m$^2$/g
[2] coarse particles, surface area 3-4 m$^2$/g Symbols:
VM straight kerf, slight evidence of brittle fracture
BF kerf edge consists of large scale brittle fracture
BFN kerf edge delineated by small scale brittle fracture
G straight kerf, no brittle fracture
C continuous
NC non-continuous
NR no residue
SR slight residue
R residue very apparent
UC no change in behavior compared to Control
S stronger than control
SCF stronger than control but some time-dependent fracture and spalling The data in Table 3 show that of all the fillers tested only CaZrO3 and coarse alumina increased the mechanical strength of the dielectric and only then at the higher filler level. Laser kerf continuity was improved by a number of fillers but only TiO$_2$ fully eliminated brittle fracture.

We claim:

1. A dielectric composition comprising an admixture of finely divided particles of (a) 65-94% by weight of a non-reducing amorphous glass frit consisting essentially on a molar basis of 15-27% ZnO, 8-30% alkaline earth metal oxides selected from 7-21% BaO, 0-20% CaO, 0-12% SrO and mixtures thereof, 40-60% SiO$_2$, 3-14% Al$_2$O$_3$, 0-5% PbO and 0.5-5% of a metal oxide selected from ZrO$_2$, up to 2.5% P$_2$O$_5$ and mixtures thereof, the composition being crystallizable and non-reducing when fired at 850°-900° C. (b) 30-5% by weight of a metal oxide selected from the group consisting of Al$_2$O$_3$, ZrSiO$_4$ and mixtures thereof, and (c) 1-5% by weight of a metal oxide kerf additive selected from the group consisting of CoAl$_2$O$_4$, Co/CrAl$_2$O$_4$, CoO, CoCr$_2$O$_4$, Cr$_2$O$_3$, TiO$_2$ and mixtures thereof, the sum of non-glass solids not exceeding 35% by weight of the total particulate admixture.

2. The composition of claim 1 which contains 1-10% by weight, basis total particulate admixture, of a TCE-reducing additive selected from the group consisting of ZrSiO$_4$, mullite, SiO$_2$ and mixtures thereof.

3. The composition of claim 1 which contains 1-10% by weight, basis total particulate admixture, of a TCE-increasing additive selected from the group consisting of CaZrO$_3$, quartz, alpha cristobalite and mixtures thereof.

4. The composition of any of claims 1-3 dispersed in an organic medium.

5. A screen-printable thick film dielectric composition comprising the composition of claim 4 in which the organic medium is comprised of a solution of organic polymer and non-volatile solvent.

6. A dielectric green tape comprising the composition of claim 4 in which the organic medium is a matrix of solid organic polymer.

* * * * *